United States Patent [19]
Benson et al.

[11] Patent Number: 5,241,380
[45] Date of Patent: Aug. 31, 1993

[54] TRACK MOUNTED SURVEILLANCE SYSTEM HAVING MULTIPLE USE CONDUCTORS

[75] Inventors: Andrew L. Benson, Excelsior; Dennis A. Carlson, Burnsville; Eric W. Laveen, Eagan, all of Minn.

[73] Assignee: Video Sentry Corporation, Excelsior, Minn.

[21] Appl. No.: 708,516

[22] Filed: May 31, 1991

[51] Int. Cl.$^5$ .............................................. H04N 7/18
[52] U.S. Cl. .................................... 358/108; 358/100; 104/295
[58] Field of Search ............... 358/100, 108, 109, 210, 358/229; 104/290, 295, 296, 297, 138.1; 246/167 R, 34 R, 63 R, 28 R, 8

[56] References Cited

U.S. PATENT DOCUMENTS

| | | | |
|---|---|---|---|
| 2,531,497 | 11/1950 | Beatty | 358/108 |
| 2,538,910 | 1/1951 | Miller | 358/108 |
| 2,633,054 | 3/1953 | Black | 88/16 |
| 3,226,476 | 12/1965 | Tyler | 178/6 |
| 3,482,037 | 12/1969 | Brown et al. | 178/6 |
| 3,874,301 | 4/1975 | Alimanestianu | 104/295 |
| 4,027,329 | 5/1977 | Coutta | 358/108 |
| 4,062,294 | 12/1977 | Cohen | 104/295 |
| 4,112,818 | 9/1978 | Garehime, Jr. | 89/41 |
| 4,120,004 | 10/1978 | Coutta | 358/108 |
| 4,510,526 | 4/1985 | Coutta et al. | 358/108 |
| 4,559,555 | 12/1985 | Schoolman | 358/88 |
| 4,656,509 | 4/1987 | Matsuyama et al. | 358/100 |
| 4,768,090 | 8/1988 | Camps et al. | 358/108 |
| 4,932,617 | 6/1990 | Heddebaut et al. | 246/8 |
| 4,950,119 | 9/1990 | Nord et al. | 104/88 |
| 4,986,187 | 1/1991 | Booth et al. | 104/297 |
| 5,018,009 | 5/1991 | Koerv | 358/108 |

FOREIGN PATENT DOCUMENTS

47808/90 12/1990 Australia .
WO92/10063 6/1992 Australia .

Primary Examiner—John K. Peng
Assistant Examiner—Glenton B. Burgess
Attorney, Agent, or Firm—Kinney & Lange

[57] ABSTRACT

A surveillance system includes a track positioned along a selected path and a moveable carriage supported by the track. A pair of electrical conductors mounted adjacent and parallel to the track provide power to a drive assembly mounted on the carriage. Video cameras are mounted to the carriage for monitoring selected regions adjacent to the path. Output signals from the cameras are transmitted on the conductors to a remote monitoring location. In the preferred embodiment, control signals for controlling placement of the carriage along the track are also transmitted on the conductors.

22 Claims, 7 Drawing Sheets

TRACK MOUNTED SURVEILLANCE SYSTEM HAVING MULTIPLE USE CONDUCTORS

BACKGROUND OF THE INVENTION

The present invention relates to a remotely actuated carriage system, and more particularly, to a system having a track mounted, moveable carriage in which power, control and monitored information are transmitted along the same conductors, and which is useful as a surveillance system.

Remote cameras for viewing or monitoring objects are known and widely used in practice. The following patents provide examples of track mounted cameras that are used for a variety of surveillance purposes.

U.S. Pat. No. 4,768,090, issued to Camps et al., discloses a surveillance device that includes a tube having a longitudinal window covered by an elastic flap. The elastic flap is lifted up to allow a video camera located in the tube to monitor objects located outside the tube. The video camera is moved within the tube through a vacuum created in the tube, or alternatively, with a stepper motor and drive wheels. Power is supplied to the surveillance device through contacts and rails suitably arranged within the tube, while antennas are provided on the surveillance device and at a remote location for transmitting and receiving signals from the video camera.

U.S. Pat. No. 4,656,509, issued to Matsuyama et al., shows a video camera and wireless communication equipment suspended from a rail. The communication equipment controls motion of the video camera on the rail and tilt adjustment of the camera. The communication equipment further receives video signals from the video camera and transmits the video signals with suitable antennas to a remote operator.

U.S. Pat. No. 4,510,526, issued to Coutta et al., discloses a surveillance system supported on a longitudinal track. The system comprises a camera, a wireless transmitter and receiver, motors and a battery secured to a platform that is propelled with friction drive wheels along the track. A power supply or battery charger is connected to bus bars that run lengthwise along the track. Through contacts located on the platform and engaging the bus bars, electrical energy is obtained from the power supply to maintain a sufficient charge on the battery. Control signals are transmitted to and video signals are received from the platform by wireless communication equipment at a remote location.

U.S. Pat. Nos. 4,027,329 and 4,120,004, both issued to Coutta, are similar to the surveillance system mentioned above in that the system comprises a video camera mounted to a suspended track. In these two patents, however, camera motion is provided by a cable and pulley system. It is believed the camera control and video signals are transmitted with wireless communication equipment.

U.S. Pat. No. 4,112,818, issued to Garehime, Jr., shows a surveillance and weapon system. The system is suspended from a longitudinal rail. The system includes separate, electrically isolated, contact wipers and bus bars to provide power and control signals to a moveable platform located on the rail. Monitored video and audio information is transmitted to a remote location on separate lines. A spring tensioned takeup reel is provided to dispense and retract the video and audio lines as the platform moves along the rail.

Additional track mounted cameras are disclosed in U.S. Pat. No. 4,559,555 issued to Schoolman, U.S. Pat. No. 3,482,037 issued to Brown et al., U.S. Pat. No. 3,226,476 issued to Tyler, and U.S. Pat. No. 2,633,054 issued to Black.

SUMMARY OF THE INVENTION

The present invention provides an improved track mounted remote control actuator system, particularly adapted for surveillance of a large area. The system includes a track positioned along a selected path and a moveable carriage supported by the track. A pair of electrical conductors mounted adjacent and parallel to the track provide power to a drive assembly mounted on the carriage. Video cameras are mounted to the carriage for monitoring selected regions adjacent to the path. Output signals from the cameras are transmitted on the conductors to a remote monitoring location.

In the preferred embodiment, control signals for controlling placement of the carriage along the track are also transmitted on the conductors to the carriage. The control signals comprise a first and second sinusoidal control signal, each control signal having a unique frequency. The first control frequency is used to control the carriage's direction of travel on the track while the second control signal is used to start and stop the carriage. Additional sinusoidal control signals, each having a unique frequency, can be included to vary speed of the carriage on the track or control other surveillance equipment.

A selected number of different control signals could be encoded, sent on a single modulated sinusoidal control frequency, and demodulated on the carriage into separate control signals. Several control signals thus could be used.

In a further preferred embodiment, the system includes proximity sensors positioned adjacent the track. The proximity sensors provide an output signal when the carriage is positioned adjacent the sensor. When used in the present invention, two proximity sensors are placed at opposite ends of the track to initiate a carriage stop command when the carriage has reached the end of the track. Any number of additional proximity sensors can be periodically positioned at desired locations along the track. When used in conjunction with switches like panic buttons, placed periodically throughout the monitored area, or open door detectors, the sensors signify when the carriage 32 has reached the area of concern.

The system is usable for industrial operations, such as for mounting a traveling hoist that is remotely operated. The video camera could be used as a monitor and the controls would include signals to raise and lower a hoist. Robot arms also could be a part of the carriage and controlled as will be described. Any drive motor for a robot function can be controlled in the same manner as the carriage drive motor described in the following specification.

DETAILED DESCRIPTION OF THE PREFERRED EMBODIMENTS

Figure 1:
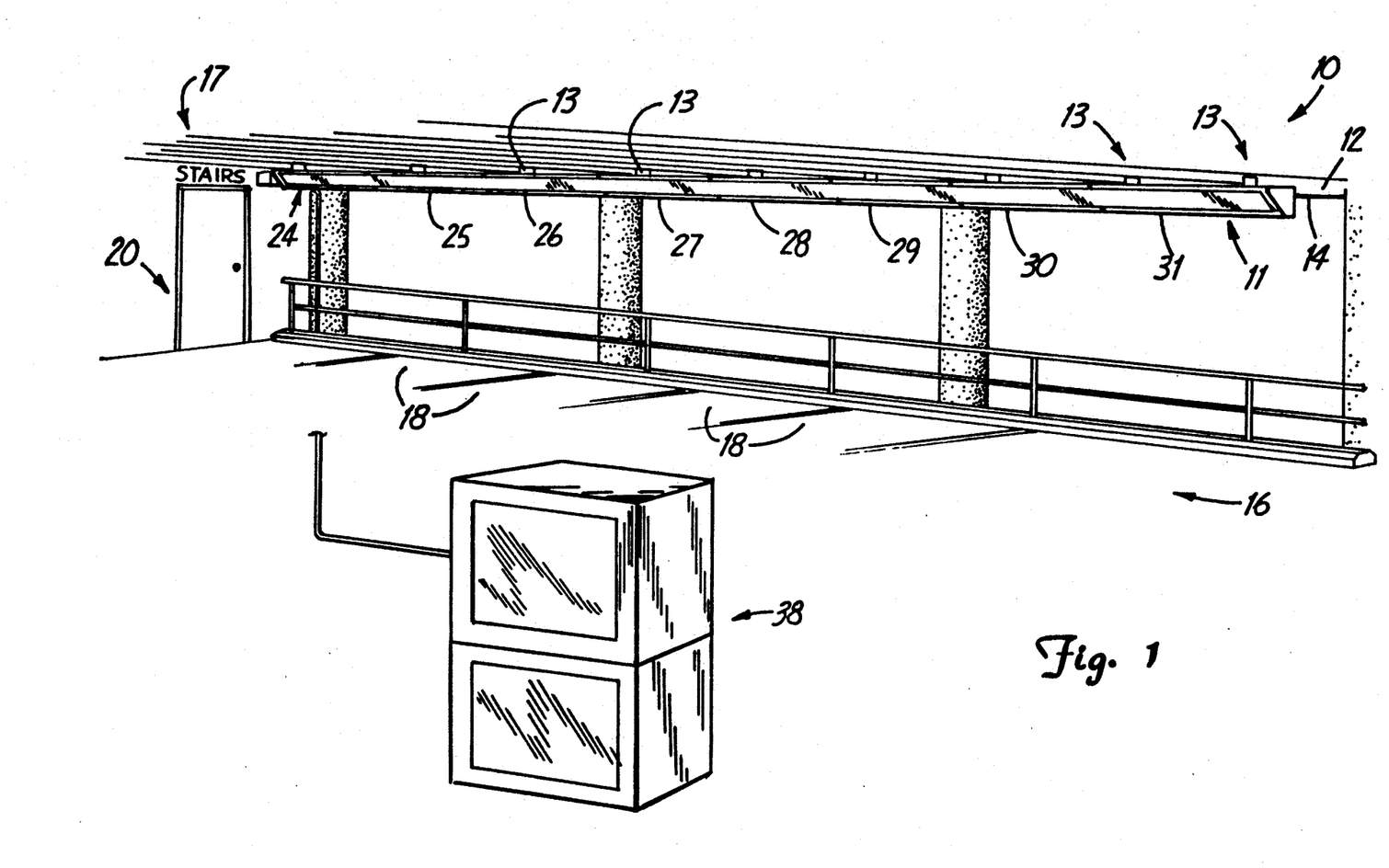
FIG. 1 is a perspective view of a track mounted surveillance system of the present invention.

Referring to the drawings, FIG. 1 illustrates an embodiment of the present invention installed as a surveillance system 10. Surveillance system 10 is mounted to a ceiling 12 with a plurality of mounting brackets 13. In this embodiment, surveillance system 10 is mounted along an outside edge 14 of a particular floor 16 of a parking garage 17. Surveillance system 10 is used to observe the overall monitored area of parking floor 16 including parking spaces 18, entrance/exit doors 20, and other adjoining walls and motor vehicle entrance/exit locations, not shown.

In the preferred embodiment, surveillance system 10 is constructed from a plurality of individual sections such as 24, 25, 26, 27, 28, 29, 30 and 31 to form a connected track assembly 11 of any given length. A movable carriage 32, shown in FIG. 2, travels repetitively back and forth within track assembly 11 to provide video images of the monitored area to remote monitors 38.

Figure 2:
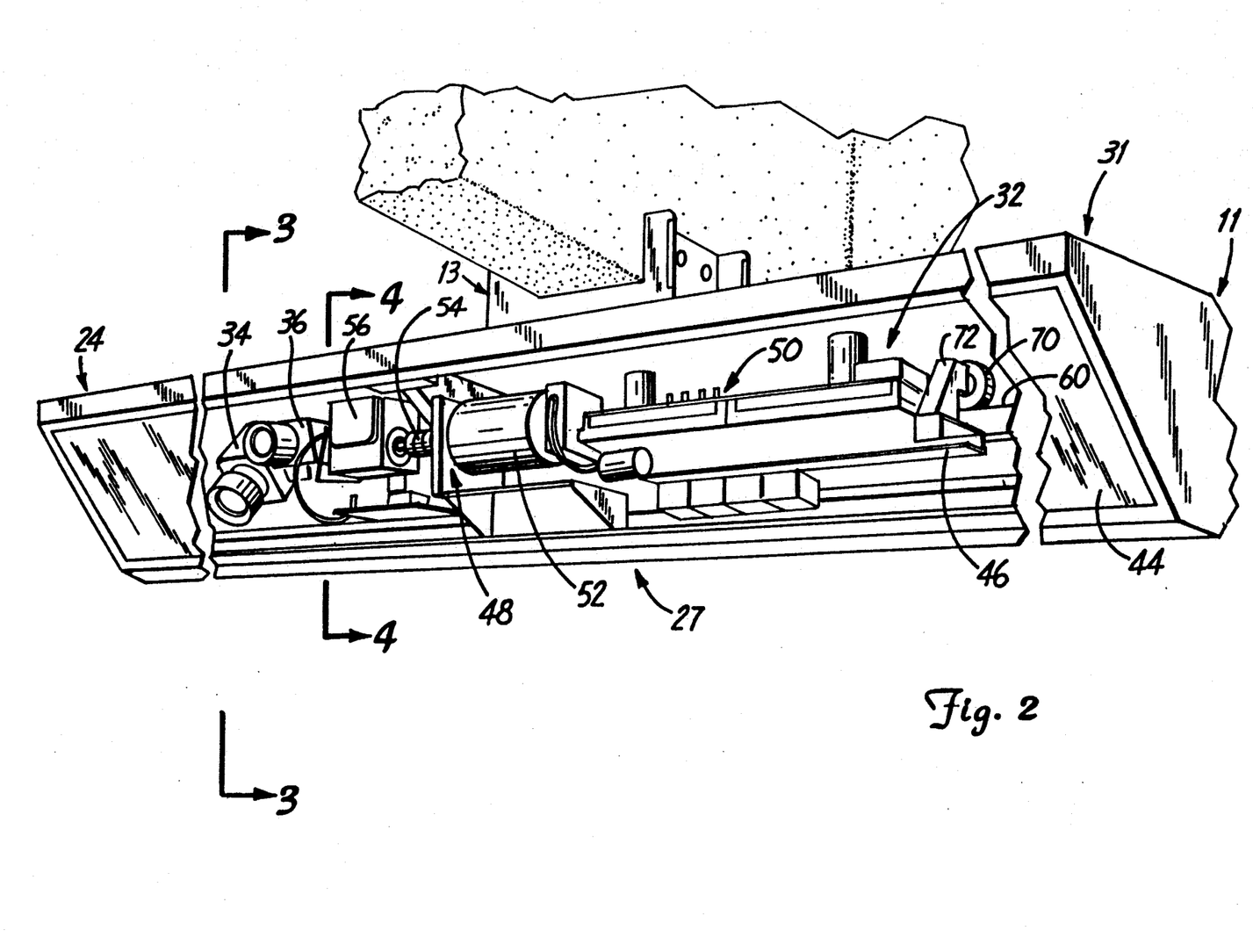
FIG. 2 is a perspective view of a portion of the track of FIG. 1, particularly illustrating a moveable carriage.

FIG. 2 illustrates carriage 32 within track section 27. Portions of end sections 24 and 31 are provided to emphasize that carriage 32 moves along the complete length of the connected track assembly 11. A semi-opaque front cover 44 has been removed from track section 27 in order to illustrate in detail the components of carriage 32. Cover 44 essentially enables one-way viewing in that cameras 34 and 36 mounted upon carriage 32 can look outward through cover 44, but people located within the monitored area would be unable to see carriage 32, thus preventing them from determining the carriage's position within the connected track assembly 11. Cover 44 is mounted within opposed upper and lower U-shaped channels 45 shown in FIG. 3.

Figure 3:
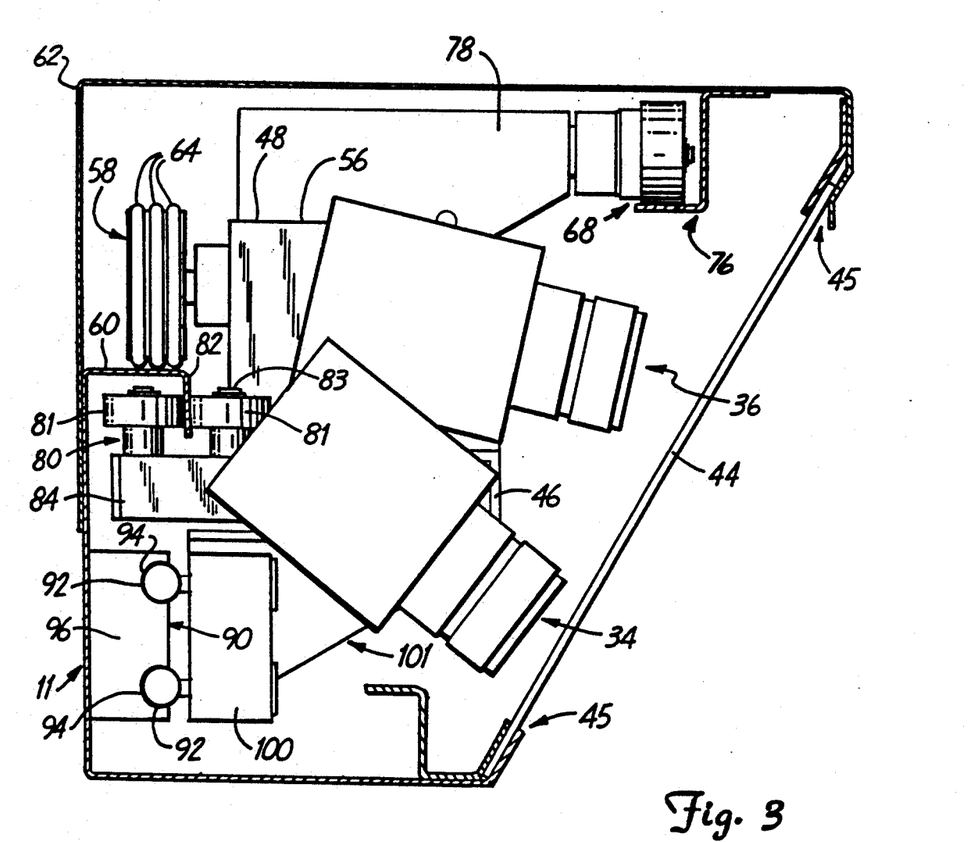
FIG. 3 is a sectional view of the track and carriage taken along line 3—3 of FIG. 2.

Carriage 32 comprises a support platform 46, cameras 34 and 36, a drive assembly 48 and drive control and video circuit boards, generally shown as 50, mounted thereupon. Cameras 34 and 36 are mounted to platform 46 at different angles in order to observe completely the monitored area. As shown in FIG. 3, camera 34 is directed downward to observe those areas below track assembly while camera 36 is directed outward to observe those areas substantially away from track assembly 11. Either or both of the cameras 34 and 36 can be equipped with a zoom type lens that would be remotely controlled by a remote counsel 112 (FIG. 5). The foregoing camera arrangement allows cameras 34 and 36 to view selected portions of the monitored area in an overlapping, panoramic view or in separate detailed close up views. Although cameras 34 and 36 are shown in FIGS. 2-4 at fixed positions, suitable known, controllable tilt mechanisms can be provided to selectively adjust each respective camera tilt angle, using motors controlled through signals in the same manner as will be described for controlling movement of the carriage 32.

Carriage 32 is driven longitudinally along the connected track assembly 11 with drive assembly 48. Drive assembly 48 comprises an electric motor 52, shown in FIG. 2, having an output shaft 54 connected to a transmission 56 which in turn rotates a drive wheel 58 shown in FIG. 4. Drive wheel 58 is positioned above a suitable drive plate 60 mounted longitudinally along a back wall 62 of each track section 24-31. The circumference of drive wheel 58 provides a rubber drive surface to improve friction with drive plate 60.

Figure 4:
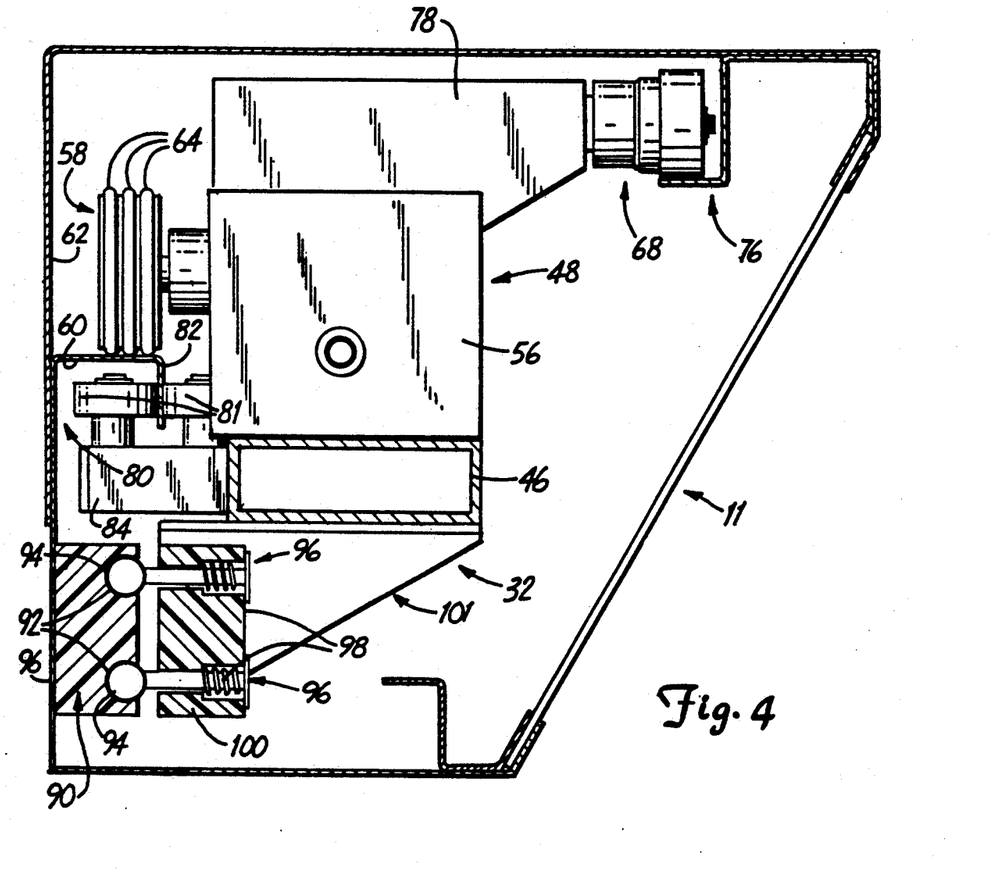
FIG. 4 is a sectional view of the track and carriage taken along line 4—4 of FIG. 2.
Figure 5:
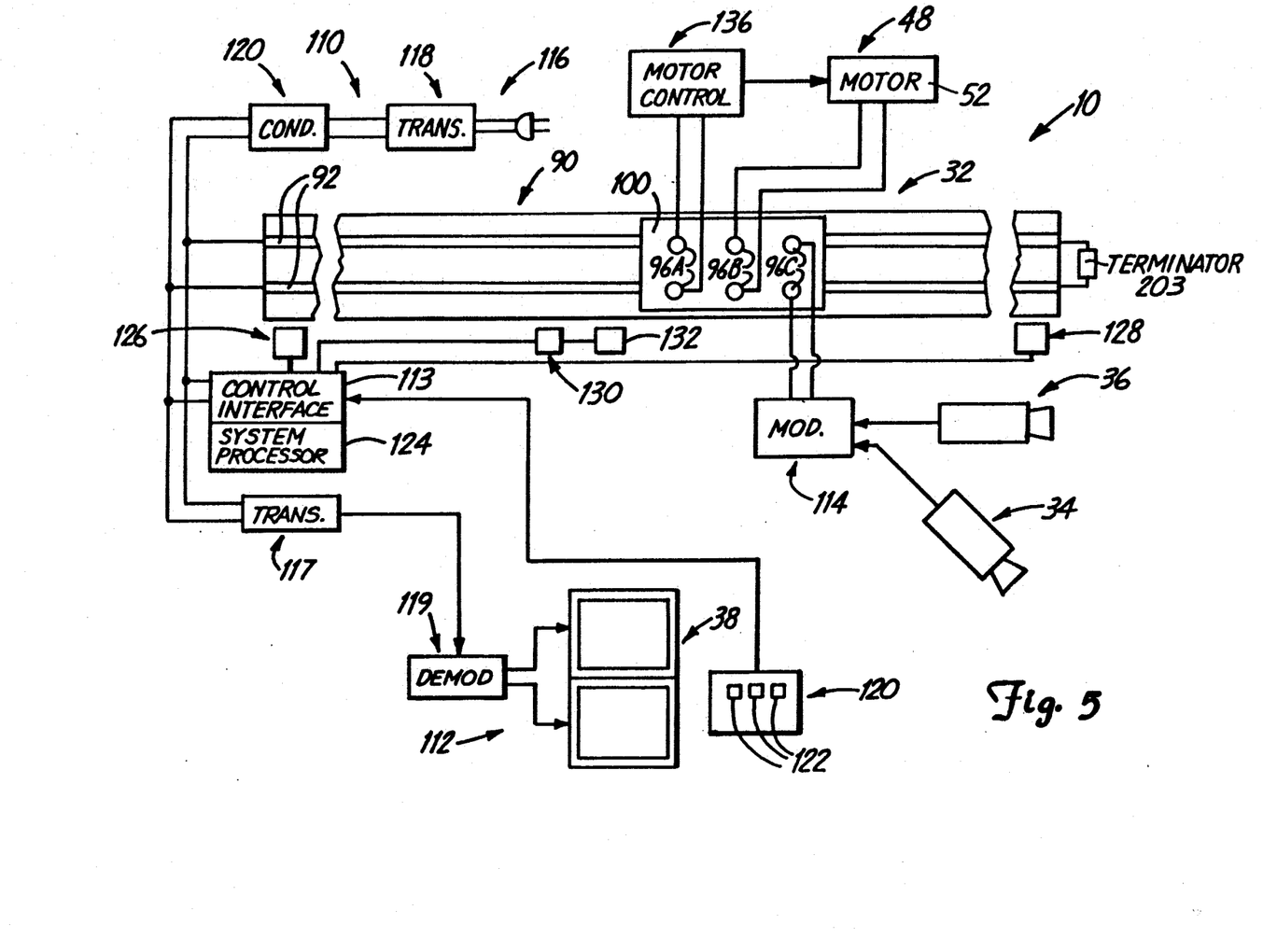
FIG. 5 is a schematic diagram of the overall surveillance system.

Drive wheel 58 together with an upper guide wheel 68, both shown in FIG. 4, and a front guide wheel 70, shown in FIG. 2, support the downward force of carriage 32. Front guide wheel 70 is supported on drive plate 60 and is connected to a suitable bracket 72 mounted to support platform 46. Upper guide wheel 68 is positioned on a L-shaped guide ledge 76 that extends longitudinally along the connected track assembly 11. Upper guide wheel 68 connects to an upward extending brace 78 that is fixed to support platform 46.

Two separate horizontal guide wheel assemblies 80, one at each end of support platform 46, provide lateral or horizontal support for carriage 32 in track assembly 11. The wheel assemblies 80 are identical and, as shown in FIG. 4, comprise two guide wheels 81 positioned on opposite sides of a guide plate 82 that extends longitudinally along the connected track sections. In the preferred embodiment, guide plate 82 is integrally formed with and extends down from drive plate 60. Guide wheels 81 are connected to support platform 46 through a suitable support brace 84 and are rotatably mounted on shafts 83 mounted on brace 84.

Referring to FIG. 4, power and control signals are provided to carriage 32 and monitored surveillance information is received from carriage 32 along a signal rail 90. Rail 90 extends longitudinally along the connected track sections on back wall 62 and comprises a pair of spaced apart, electrically isolated conductors 92. In the preferred embodiment, conductors 92 comprise cylindrical, copper tubing suitably mounted and supported within semi-cylindrical grooves 94 of an isolation block 96 made of electrically insulating material. Each conductor 92 is in slidable contact with at least one corresponding isolated slidable electrically conductive brush 96 (shown schematically as brushes 96A, 96B, and 96C in FIG. 5) along the length of rail 90. Each brush 96 is biased against the respective conductor 92 by a spring 98 that is inserted within a support 100 also made of electrically insulating material. Brushes 96 are mounted to support platform 46 with a suitable bracket 101

The overall surveillance system 10 is illustrated in the schematic diagram of FIG. 5. Besides carriage 32 and rail 90, the system includes a remote monitoring and control station 12, a control interface 113, and a power source 110. Control station 112 allows an operator to monitor the video images from cameras 34 and 36 and is located in a convenient location, such as a building control office. The output signals from cameras 34 and 36 are each provided to a video modulator board 114 on carriage 32 where suitable carrier signals are frequency modulated by each respective camera output signal in a known manner. The output signal from video modulator board 114 is applied to brushes 96C that slidably engage conductors 92. Conductors 92 are connected to a video adaptor 117 comprising a transformer for isolation and impedance matching to insure getting a good video signal capable of transmission. An output signal from video adaptor 117 is provided to a demodulator 119 by suitable transmission wires such as a coaxial cable since both video adapter 117 and demodulator 119 are fixed installations. Demodulator 119 demodulates each camera output signal from its respective carrier signal and displays the corresponding image on monitors 38, again using known techniques.

Remote station 112 includes a control console 120 which would be used by the operator to control placement of carriage 32 to obtain the desired surveillance. Counsel 120 contains conventional circuitry to apply, by means of any convenient control devices 122, the desired operator command signals to control interface 113. Such operator command signals include switches for direction and adjustable controls for establishing rate of travel of carriage 32 along the connected track sections or, if desired, an automatic mode operation wherein the carriage travels back and forth along the connected track sections without operator intervention. If further desired, additional control devices can be added to manage, for example, tilt angles and zoom capabilities of the cameras, or other types of monitoring equipment.

Control interface 113 is connected to a system processor 124. System processor 124, comprising a conventional micro-processor, receives the desired command signals from counsel 120 and input signals through control interface 113 from proximity sensors 126, 128 and 130 that are positioned along the connected track sections. From both the command signals and activation of the proximity sensors when the carriage 32 is positioned adjacent a respective proximity sensor, the system processor 124 determines which control signals are transmitted along conductors 92 to carriage 32.

Sensors 126 and 128, positioned at opposite ends of the connector track sections, signify that the carriage 32 has reached the respective end of track assembly 11. If carriage 32 is under manual operation by the operator at the remote monitoring station 112, activation of an end sensor 126 or 128 would initiate a carriage stop command from the system processor 124 thereby stopping carriage 32 and preventing further movement in the same direction beyond the end of the track assembly 11. Alternatively, if the system is under automatic control, activation of end sensor 126 or 128 would cause carriage 32 to stop and subsequently begin travel in the opposite direction, again from an appropriate command provided by the system processor 124. Any number of additional proximity sensors 130 can be periodically positioned at desired locations along the connected track sections. When used in conjunction with switches 132, such as panic buttons, placed periodically throughout the monitored area, or open door detectors, the sensors 130 signals the system processor 124 to indicate when the carriage 32 is adjacent the area of concern.

Figure 6:
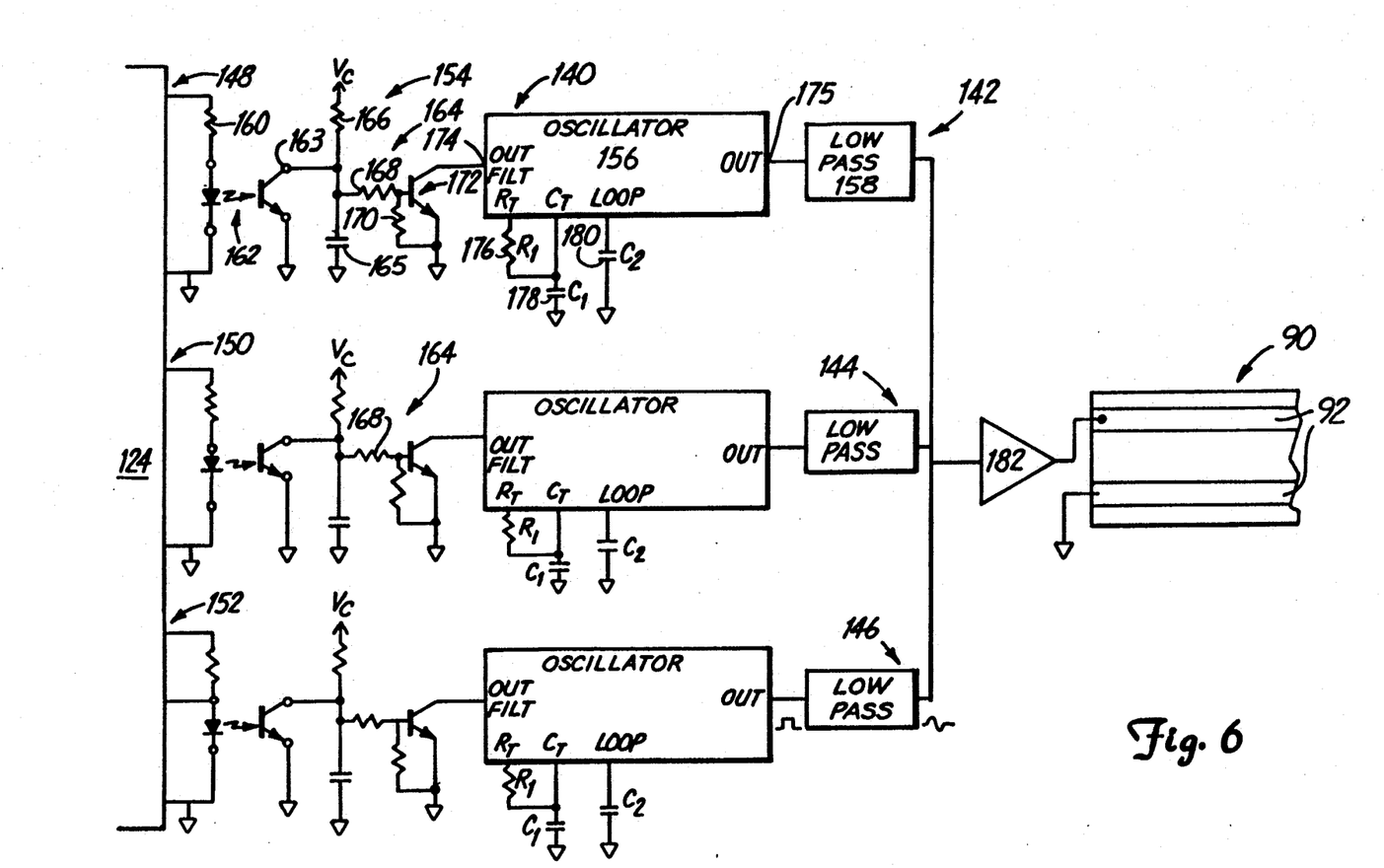
FIG. 6 is a schematic diagram of a control signal generating circuit.

As with the video images described above, the control signals for carriage 32 are transmitted on conductors 92. In the preferred embodiment, the control signals comprise separate sinusoidal signals each having a unique frequency transmitted for an appropriate time duration. The circuit for generating such signals are shown in FIG. 6. In the present invention, two separate sinusoidal control signals at two unique frequencies are used. The first control signal frequency signifies direction of carriage travel whereby transmission of the first control signal causes the carriage to travel in a first direction along the track while absence of the first control signal causes the carriage to travel in the reverse direction.

The second control signal signifies speed of travel. When the second control signal is transmitted, the carriage moves along the track in the previously selected direction. When transmission of the second control signal is discontinued, the carriage stops. An additional third control signal at a third unique frequency can be added to vary the speed of the carriage. In this embodiment, transmission of the third control signal, without transmission of the second control signal, increases the speed of the carriage. If both the second and third control signals are transmitted the carriage travels at its fastest rate.

The information contained on any one or all of the sinusoidal control signals could be increased by a variety of modulation techniques such as, but not limited to, pulse width, pulse position, or pulse code modulation. The circuit would then include a modulator at the control station and a demodulator on the carriage for providing discrete control signals for the motor and other operated components on the carriage.

Figure 7:
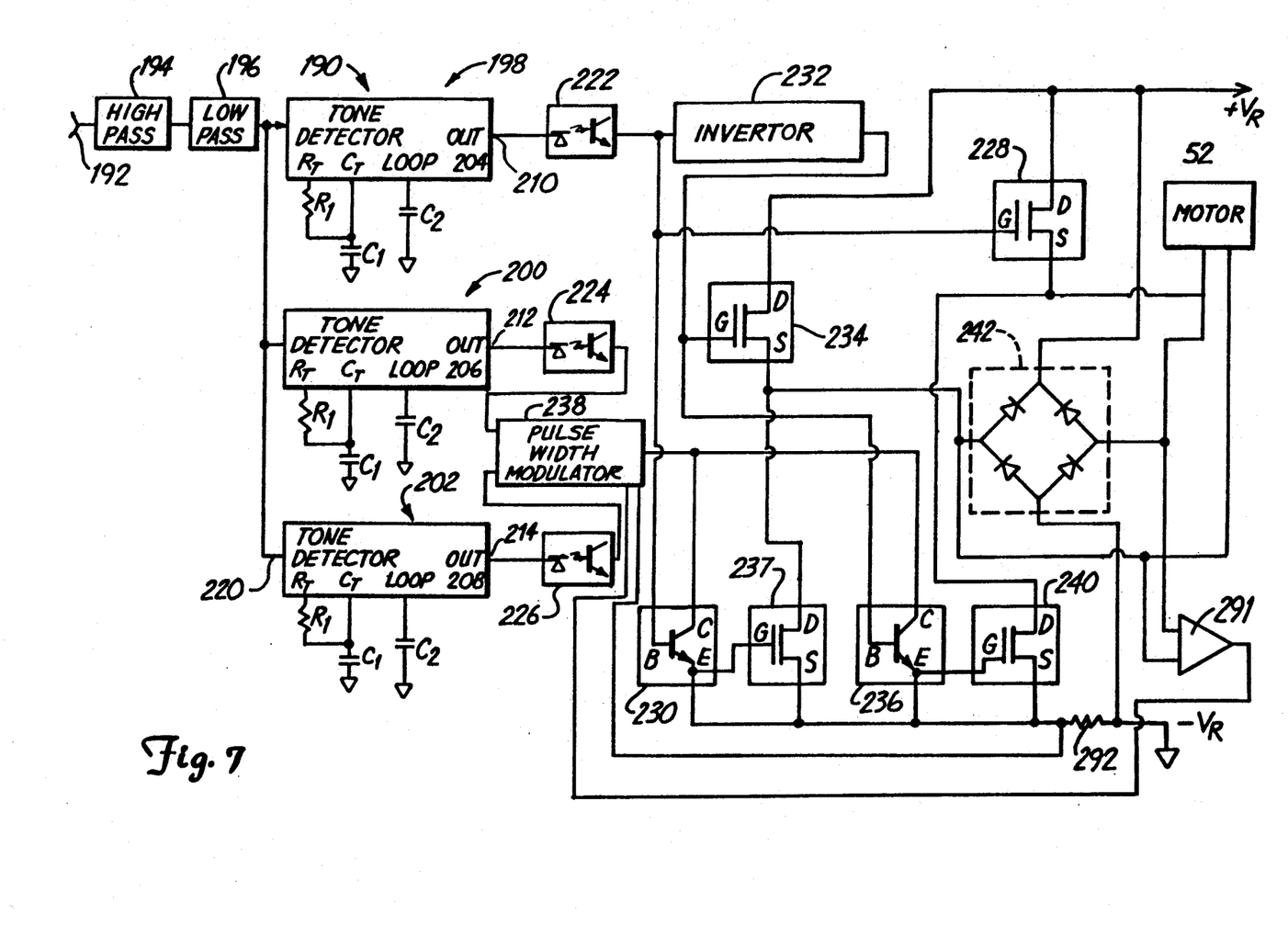
FIG. 7 is a schematic diagram of a control signal decoding circuit.

A motor control adaptor 136 mounted to carriage 32 detects the presence of any control signals on conductors 92 through brushes 96A. Motor control adaptor 136 as will be shown in detail in FIG. 7 provides appropriate command signals of direction and speed to the drive assembly 48 based on the detected control signals. If desired, additional control signals at additional unique frequencies can be provided to control camera operation and other forms of monitoring equipment mounted to the carriage 32.

Power source 110 is connected to each conductors 92 of rail 90 to provide all necessary power to carriage 32. In the preferred embodiment using a conventional 115 AC voltage source 116, the voltage is reduced through a step-down transformer 118, the output of which being rectified and conditioned to suitable DC voltage (for example 30 volts) through convertor 120. Alternatively, AC voltage can be applied to rail 90 with DC conversion performed on carriage 32. Required power to operate drive assembly 48, specifically motor 52, is carried through brushes 96B to the motor.

A control driver circuit 140 for generating each of the frequency controlled control signals based on commands from the system processor is illustrated in FIG. 6. Control driver circuit 140 comprises three signal generating circuits 142, 144, and 146 each generating a control signal at a unique frequency based on initiation of the generating circuits at inputs 148, 150 and 152, respectively. Inasmuch as each signal generating circuit 142, 144 and 146 is identical, with differences only in circuit components to generate a unique control frequency, different from the frequencies of the other signal generating circuits, description will be confined to signal generating circuit 142. Signal generating circuits 144 and 146 operate in the same manner.

Signal generating circuit 142 comprises an input isolation circuit 154, an adjustable square wave oscillator 156 and a low pass output filter 158. Input 148 is connected to current limit resistor 160 that is in turn series connected to photo-coupled isolation transistor 162. Collector 163 of transistor 162 is connected to a transistor circuit 164. An appropriate filter capacitor 165 and bias resistors 166, 168 and 170, selected on the basis of the supply voltage, are provided to operate transistor 172 as an invertor. The collector of transistor 172 provides an input signal to oscillator 156 at input 174.

Oscillator 156 generates a square wave control signal at a unique frequency. In the preferred embodiment, oscillator 156 comprises an LM567 Tone Decoder, manufactured by National Semiconductor. The output frequency ($f_o$) at output 175 of oscillator 156 is approximated by $$f_o \approx \frac{1}{1.1 R_1 C_1}$$

where ($R_1$) is resistor 176 and ($C_1$) is capacitor 178. Capacitor ($C_2$) 180 is used for bandwidth adjustment. In the preferred embodiment, the output frequency of signal generating circuits 142, 144 and 146 are adjusted within the range 20-40 KHz. Further reference is herein made to National Semiconductor Linear Databook (1982) for specific operating characteristics of the LM567 Tone Decoder. A crystal oscillator can be used as an alternative embodiment to the Tone Decoder previously described. Crystal controlled oscillators for providing a square wave signal at selected frequencies are known.

Initiation and generation of the control signal from signal generating circuit 142 is as follows. With an appropriate voltage applied to input 148 initiated from system processor 124, transistor 162 is turned on, lowering the voltage at collector 163 and turning off transistor 172. With transistor 172 turned off, oscillator 156 is initiated, producing the control signal with the unique frequency at output 175. The output control signal at 175 is applied to low pass filter 158 which removes the harmonic frequencies that are the above frequency selected for oscillator 156. Low pass filter 158 provides an output signal that is substantially sinusoidal at the frequency of oscillator 156. The output of low pass filter 158 is in turn connected to an amplifier 182 the output of which is connected to one of the conductors 92. The control signal is transmitted to the carriage 32 on conductor 92 for an appropriate time duration sufficient such that the signal is recognized as a legitimate control signal using tone detector circuits shown in FIG. 7. After the selected time, the input voltage at input 148 is removed, turning off oscillator 156.

Each of the control signals generated by control driver circuit are detected separately upon transmission on conductors 92 by a receiver and frequency detector circuit 190 shown in FIG. 7 of motor control adaptor 136. Receiver circuit 190 comprises an amplifier 192 connected in series with a high pass filter 194 and a low pass filter 196. In the preferred embodiment, high pass filter 194 substantially removes all signals with frequencies less than 15 KHz, while low pass filter 196 substantially removes all signals with frequencies greater than 45 Khz.

The output signal from low pass filter 196 on a signal line 197 is provided in parallel to three tone detector circuits 198, 200 and 202. As with the signal generating circuits 142, 144 and 146 of the control driver circuit 140 described above, each of the tone detector circuits 198, 200 and 202 is identical with differences only in circuit components such that each tone detector circuit responds to a specific control frequency, matched to one of the unique frequency outputs of signal generating circuits 142, 144 and 146. A terminator 203 can be provided between conductors 92 to minimize signal reflections which can interfere with the R.F. signals from the video carrier (see FIG. 5). The use and selection of termination values to reduce signal reflections are known.

In the preferred embodiment, tone detector circuits 198, 200 and 202 of motor control adapter 136 each include an LM567 tone decoder 204, 206, and 208 described above. Each tone decoder 204, 206 and 208 provides a saturated transistor switch to ground output signal at outputs 210, 212 and 214, respectively, when an input signal having the selected frequency is detected at the respective inputs 216, 218 and 220. The selected response frequency of each tone decoder is adjusted with $R_1$ and $C_1$ according to the equation given above while the bandwidth is adjusted by $C_2$. The output signals from tone detectors 198, 200 and 202 are provided to isolation means 222, 224 and 226 respectively. The isolation means 222, 224 and 226 are devices capable of providing an output signal that is electrically isolated from its input signal. In one preferred embodiment, a 4N35 photo coupled isolation transistor is used as the isolation means 222, 224 and 226.

The output signal from isolation means 222 is provided to switch means 228, drive means 230 and invertor 232. The invertor 232 represents a device capable of providing an output signal that is the compliment of the input signal. The output signal of invertor 232 is provided to switch means 234 and drive means 236. The outputs of isolation means 224 and 226 are provided to pulse width modulator 238. The pulse width modulator 238 provides an output signal having any one of a number of predetermined duty cycles that can be selected by the pulse width modulator 238 inputs. The pulse width modulator 238 output signal is provided to the inputs of drive means 230 and 236.

Drive means 230 and 236 represent any such device capable of providing an output signal that is suitable to control switch means 238 and 240. In one preferred embodiment, drive means 230 and 236 are bipolar transistors such as 2N2907's. Drive means 230 and 236 have an enable input represented by the base portion of the bipolar transistor and a signal input represented by the collector portion of the bipolar transistor. The output of drive means 230 and 236 is represented by the emitter portion of the bipolar transistor. The output signal from drive means 230 and 236 are provided to the inputs of switch means 237 and 240, respectively.

Switch means 228, 234, 237 and 240 are any such devices capable of high current switching such as field effect transistors (FET). In one preferred embodiment, switch means 228, 234, 237 and 240 are Power FET's of the type IRFZ 40. Switch means 228, 234, 237 and 240 are connected together to form an "H switch" with switch means 234 and 228 forming the upper half of the "H" and switch means 237 and 240 forming the lower half of the "H." The upper and lower portions of the "H" are connected to the positive and negative terminals of supply voltage $V_R$, respectively. Motor 52 is connected between the upright portions of the "H" i.e., between the source terminals of the FETS represented in switch means 234 and 237.

Diode bridge 242 is connected between power supply $V_R$ with the common cathode junction connected to $+V_R$ and the common anode portion connected to $-V_R$.

In operation, an output signal 210 from tone detector 198 above a certain magnitude closes switch means 228 thereby providing a low resistance path between one input to motor 52 and the positive rail voltage $+V_R$. Nearly simultaneous with the closing of switch means 228, switch means 237 becomes conducting for a selected duty cycle determined by the pulse width modulator 238. Switch means 234 is out of phase from switch means 228 and therefore is open. The motor 52 has an effective EMF determined by the duty cycle of the pulse width modulator 238. Bridge 242 provides an alternate path for motor current when the switches are open, thereby preventing voltage spikes from the windings of motor 52 from damaging the switch circuits.

When output signal 210 from tone detector 198 is pulled to ground, switch means 234 is closed and switch means 228 is open. The voltage across motor 52 is now reversed from the previous case when the tone detector output signal 210 was above a threshold level. Switch means 240 is conducting for a duty cycle determined by pulse width modulator 238. In this manner, the direction of the motor rotation and thus the carriage 32 direction can be controlled.

Pulse width modulator 238 may be selected such that the output signal 212 from tone detector 200 acts as an enable signal for the pulse width modulator 238. The output signal 214 of tone detector 202 can then be used to select one of two predetermined duty cycles from pulse width modulator 238. Representing a slow and a fast speed for the carriage 32. Additional control frequency tone detectors with corresponding control frequency signal generators can be added to the surveillance system to control additional monitoring functions such as zoom capabilities and tilt angles of the cameras.

In summary, the present invention provides a track mounted, remotely controlled system well suited for many installations. The system is flexible both in installation and operation, yet remains unobtrusive. With transmission of power, control and as disclosed monitor signals on a single pair of conductors, the system has eliminated wireless communication equipment, simplifying the overall design, and thus, reducing manufacturing costs. For many industrial applications the carriage could mount hoists, robot arms, or other work elements that may be remotely controlled using the same signal transmission for control as described. Video also can be used for monitoring operations.

Improved motor control performance can be achieved by incorporating conventional motor back EMF speed sensor 291 and motor current sensor 292 to provide signals as additional inputs to pulse width modulator 238. Examples of improved motor performance could include more accurate carriage speed control, and smoothly controlled acceleration and deceleration.

The track and system can be mounted on ceilings or other structural components. The track also can be mounted so the carriage runs vertically. The drive rollers can be modified to be pinch rollers running on a flange or vertical track-like cable for vertical travel.

Although the present invention has been described with reference to preferred embodiments, workers skilled in the art will recognize that changes may be made in form and detail without departing from the spirit and scope of the invention.

What is claimed is:

1. A surveillance security system comprising:
 a carriage track positioned along a path, the carriage track having a first end and a second end;
 a pair of electrical conductors mounted along the path parallel to the track from the first end to the second end;
 a carriage adapted to be supported by and moveable on the track;
 drive means mounted on the carriage for positioning the carriage along the track, the drive means contacting the pair of electrical conductors to receive a power signal, the power signal providing sufficient electrical power to move the carriage;
 camera means mounted on the carriage to monitor regions along and adjacent the path and provide an output signal representative of the monitored regions;
 modulation means connected to the camera means receiving the output signal and modulating a carrier signal with the output signal, the modulation means contacting the pair of electrical conductors to transmit the modulated carrier signal on the pair of electrical conductors to a remote monitoring station connected to the pair of electrical conductors; and
 termination means connected to the pair of electrical conductors remote from the modulation means for minimizing reflections of signals transmitted on the pair of electrical conductors.

2. The apparatus as set forth in claim 1 and further comprising control means connected to the pair of electrical conductors, the control means generating a first control signal for controlling operation of the drive means, the first control signal transmitted to the drive means on at least a portion of the pair of electrical conductors and having a frequency different than the power signal.

3. The apparatus as set forth in claim 2 wherein the first control signal selectively controls direction of carriage motion; and the control means further generates a second control signal transmitted to the drive means on at least a portion of the pair of electrical conductors, the second control signal selectively controlling the speed of carriage travel.

4. The apparatus as set forth in claim 3 wherein the first control signal comprises a first frequency and the second control signal comprises a second frequency.

5. The apparatus as set forth in claim 3 wherein the electrical power provided to the drive means is pulse width modulated to selectively control the speed of carriage travel.

6. The apparatus as set forth in claim 1 and a proximity sensor positioned adjacent the track, the proximity sensor providing an output signal when the carriage is positioned adjacent the sensor.

7. The apparatus as set forth in claim 6 wherein the proximity sensor is positioned at the end of the track, and a second proximity sensor is positioned at the opposite end of the track.

8. The apparatus as set forth in claim 1 and display means located at the remote location and electrically connected to the pair of conductors, the display means receiving the electrical output signal and displaying a representative video output.

9. A surveillance security system comprising:
 a carriage track positioned along a path, the carriage track having a first end and a second end;
 a pair of electrical conductors mounted along the path parallel to the track from the first end to the second end;
 a carriage adapted to be supported by and moveable on the track;
 drive means mounted on the carriage for positioning the carriage along the track, the drive means contacting the pair of electrical conductors to receive a power signal, the power signal providing sufficient electrical power to move the carriage;
 camera means mounted on the carriage to monitor regions along the path and provide an output signal representative of the monitored regions;

modulation means connected to the camera means receiving the output signal and modulating a carrier signal with the output signal, the modulation means contacting the pair of electrical conductors to transmit the modulated carrier signal on the pair of electrical conductors to a remote monitoring station connected to the pair of electrical conductors; and termination means connected to the pair of electrical conductors remote from the modulation means for minimizing reflections of signals transmitted on the pair of electrical conductors; and control means mounted on the carriage receiving a control signal to selectively control the drive means to position the carriage, the control signal being transmitted on the pair of electrical conductors and having a frequency different than the power signal.

10. A surveillance security system comprising:

a carriage track positioned along a path, the carriage track having a first end and a second end;

a pair of electrical conductors mounted along the path parallel to the track from the first end to the second end;

a carriage adapted to be supported by and moveable on the track;

drive means mounted on the carriage for positioning the carriage along the track, the drive means contacting the pair of electrical conductors to receive a power signal, the power signal providing sufficient electrical power to move the carriage;

a remote receiving station connected to the pair of electrical conductors;

surveillance means mounted on the carriage to monitor regions along the path and provide an output signal representative of the monitored regions; and modulation means connected to the surveillance means receiving the output signal and modulating a carrier signal with the output signal, the modulation means contacting the pair of electrical conductors to transmit the modulated carrier signal on the pair of electrical conductors to the remote monitoring station; and termination means remote from the modulation means connected to the pair of electrical conductors for minimizing reflections of signals transmitted on the pair of electrical conductors.

11. The system of claim 10 wherein said surveillance means comprises a camera for monitoring regions along and adjacent the path, the camera providing an output signal representative of the monitored regions.

12. The system as set forth in claim 10 and control means connected to the pair of electrical conductors, the control means generating a first control signal for controlling operation of the drive means, the first control signal transmitted to the drive means on at least a portion of the pair of electrical conductors and having a frequency different than the power signal.

13. The system as set forth in claim 12 wherein the first control signal selectively controls direction of the carriage; and the control means further generates a second control signal transmitted to the drive means on at least a portion of the pair of electrical conductors, the second control signal selectively controlling a further function of the carriage.

14. The system as set forth in claim 13 wherein the first control signal comprises a first frequency and the second control signal comprises a second frequency.

15. A surveillance security system comprising:

a housing having an elongated surveillance opening positioned along a longitudinal path;

a carriage track positioned in the housing along the path, the carriage track comprising a first guide member substantially parallel to the path, and a second guide member mounted below, laterally spaced from and substantially parallel to the first guide member, the carriage track having a first end and a second end;

a pair of electrical conductors mounted along the path parallel to the track from the first end to the second end;

a carriage adapted to be supported by and moveable on the first guide member and the second guide member;

drive means mounted on the carriage for positioning the carriage along the carriage track, the drive means contacting the pair of electrical conductors to obtain sufficient electrical power to move the carriage;

surveillance means mounted on the carriage substantially between the first and second guide members and below the first guide member, the surveillance means monitoring regions along and adjacent the path through the surveillance opening and providing an output signal representative of the monitored regions;

modulation means connected to the surveillance means receiving the output signal and modulating a carriage signal with the output signal, the modulation means contacting the pair of electrical conductors to transmit the modulated carrier signal on the pair of electrical conductors to a remote monitoring station connected to the pair of electrical conductors; and termination means connected to the pair of electrical conductors remote from the modulation means for minimizing reflections of signals transmitted on the pair of electrical conductors.

16. The system as set forth in claim 15 wherein the first guide member comprises a guide ledge connected to the housing above the surveillance opening, and wherein the second guide member comprises a second guide ledge connected to the housing.

17. The system as set forth in claim 16 wherein the carriage includes a first wheel for rolling on the first guide ledge and a second wheel for rolling on the second guide ledge.

18. The system as set forth in claim 15 wherein the housing includes a wall opposite the surveillance opening and the second guide ledge is connected to the wall.

19. The system as set forth in claim 15 and further comprising lateral means for maintaining lateral position of the carriage for movement along the carriage track.

20. The system as set forth in claim 19 wherein the lateral means comprises a lateral guide surface substantially perpendicular to a guide surface of the second guide member.

21. The system as set forth in claim 15 wherein the drive means comprises a drive wheel contacting the second guide member.

22. The system as set forth in claim 15 wherein the surveillance means comprises a camera.

* * * * *

UNITED STATES PATENT AND TRADEMARK OFFICE
CERTIFICATE OF CORRECTION

PATENT NO. : 5,241,380
DATED : August 31, 1993
INVENTOR(S) : Andrew L. Benson et al.

It is certified that error appears in the above-indentified patent and that said Letters Patent is hereby corrected as shown below:

Col. 10, Line 66, delete "monitor", insert "view"

Signed and Sealed this

Twenty-second Day of February, 1994

Attest:

BRUCE LEHMAN

Attesting Officer     Commissioner of Patents and Trademarks